(12) United States Patent
Duan et al.

(10) Patent No.: US 11,703,153 B2
(45) Date of Patent: Jul. 18, 2023

(54) ENCAPSULATED TUBULAR CABLE WITH COLORIZED IDENTIFICATION STRAP, AND PREPARATION METHOD THEREOF

(71) Applicant: Shinda (Tangshan) Creative Oil & Gas Equipment Co., Ltd., Hebei (CN)

(72) Inventors: Jianliang Duan, Tangshan (CN); Jian Dong, Tangshan (CN)

(73) Assignee: SHINDA (TANGSHAN) CREATIVE OIL & GAS EQUIPMENT CO., LTD.

( * ) Notice: Subject to any disclaimer, the term of this patent is extended or adjusted under 35 U.S.C. 154(b) by 81 days.

(21) Appl. No.: 17/439,120

(22) PCT Filed: May 13, 2021

(86) PCT No.: PCT/CN2021/093523
§ 371 (c)(1),
(2) Date: Sep. 14, 2021

(87) PCT Pub. No.: WO2022/236759
PCT Pub. Date: Nov. 17, 2022

(65) Prior Publication Data
US 2022/0390043 A1 Dec. 8, 2022

(30) Foreign Application Priority Data
May 10, 2021 (CN) .......................... 202110505523.1

(51) Int. Cl.
*F16L 3/26* (2006.01)
*F16L 3/22* (2006.01)
(Continued)

(52) U.S. Cl.
CPC ................. *F16L 3/26* (2013.01); *F16L 3/222* (2013.01); *G02B 6/4459* (2013.01);
(Continued)

(58) Field of Classification Search
CPC ...... G02B 6/44; G02B 6/4459; G02B 6/4485; G02B 6/4486; H02G 3/04; F16L 3/222
See application file for complete search history.

(56) References Cited

U.S. PATENT DOCUMENTS

| 10,215,940 B1 * | 2/2019 | Peterson, III ........ G02B 6/4488 |
| 2017/0351045 A1 * | 12/2017 | Kimoto ................. G02B 6/443 |
| 2020/0183133 A1 * | 6/2020 | Huang ............... G02B 13/0045 |

* cited by examiner

*Primary Examiner* — Tina M Wong
(74) *Attorney, Agent, or Firm* — Nields, Lemack & Frame, LLC (57) ABSTRACT

An encapsulated tubular cable with a colorized identification strap includes armored protection ducts and an encapsulation protection layer. A hollow passage is formed in the center of the duct body after each armored protection duct is formed. A wire cable, an optical fiber, or an oil duct is placed in the hollow passage. The encapsulation protection layer wraps the armored protection ducts. A plurality of armored protection ducts are arranged in one encapsulated protection layer. A peripheral edge of each armored protection duct is correspondingly provided with at least one colorized identification strap group. The encapsulation protection layer improves the corrosion resistance of the encapsulated duct cable; the colorized identification straps are provided at the thinnest positions of the encapsulation protection layer to facilitate tearing and encapsulation; and each colorized identification strap has a respective color identifier, which is convenient for distinguishing objects in each hollow passage during use.

16 Claims, 9 Drawing Sheets

(51) Int. Cl.
  *G02B 6/44* (2006.01)
  *H02G 3/04* (2006.01)
(52) U.S. Cl.
  CPC ......... *G02B 6/4482* (2013.01); *G02B 6/4486* (2013.01); *H02G 3/04* (2013.01); *F16L 2201/60* (2013.01)

ENCAPSULATED TUBULAR CABLE WITH COLORIZED IDENTIFICATION STRAP, AND PREPARATION METHOD THEREOF

CROSS REFERENCE TO RELATED APPLICATION

This patent application claims the benefit and priority of Chinese Patent Application No. 202110505523.1 filed on May 10, 2021; the disclosure of which is incorporated by reference herein in its entirety as part of the present application.

TECHNICAL FIELD

The present disclosure relates to the field of logging cables, in particular to an encapsulation tubular cable with colorized identification straps, and a preparation method thereof.

BACKGROUND ART

Logging cables can be used for logging, perforation, coring and other operations of various kinds of oil and gas wells, as well as for water conservancy and hydrology surveying, oilfield geological exploration, geothermal logging, etc. The logging cables are used as a load bearing connection between a surface system and an underground instrument and a connection wire for transmitting measurement data.

In existing encapsulated duct cables, when multiple duct cables are combined with a hydraulic control duct, it is difficult to distinguish the functions of the various ducts, and it is difficult to peel off an external encapsulation. In view of application condition of products, colorized peeling straps that are convenient to distinguish and have a peeling function are added in a tubular cable manufacturing process, and an encapsulated profile is machined and designed, thereby solving the problem of hard distinguishing during use of the products.

SUMMARY

The present disclosure is directed to provide an encapsulated tubular cable with colorized identification straps, so as to solve the problem that it is hard to distinguish functions of multiple duct cables after the duct cables are combined and is inconvenient to identify.

In order to solve the above technical problem, the present disclosure provides the following technical solution.

It is provided an encapsulated tubular cable with colorized identification straps, including armored protection ducts and an encapsulation protection layer. Hollow passages are respectively formed in centers of the armored protection ducts. Cables, optical fibers, or oil tubes are placed in the hollow passages. The encapsulation protection layer wraps around the armored protection ducts. A plurality of armored protection ducts are arranged in the encapsulated protection layer. An outer peripheral edge of each armored protection duct is provided with at least one colorized identification strap group.

Further, the armored protection duct is made of a welded stainless steel tube, and the encapsulation protection layer is made of a non-metal material.

Further, the encapsulation protection layer is designed to be a special-shaped single-layer structure, a double-layer structure, or an arc-shaped structure.

Further, when the encapsulation protection layer is designed to be the special-shaped single-layer structure, four outer side surfaces of the encapsulation protection layer each are provided with sunken regions. Wide outer side surfaces of the four outer side surfaces each are provided with a plurality of first sunken regions, and narrow outer side surfaces of the four outer side surfaces each are provided with one second sunken region. At least one thin portion of the outer periphery edge of the armored protection duct which corresponds to the first sunken regions or the second sunken region is provided with the colorized identification strap group.

Further, the encapsulation protection layer includes an inner positioning layer and an outer positioning layer when being designed to be the double-layer structure. The inner positioning layer is disposed at the outer periphery edge of each armored protection duct wrapping around corresponding hollow passage. A side edge of the colorized identification strap group facing away from the armored protection duct is flush with an outer peripheral edge of the inner positioning layer. The outer protection layer (3-2) is wrapped on an outer peripheral surface of the inner positioning layer.

Further, straps of the colorized identification strap group are made of aramid ropes, and a single colorized identification strap group is formed by twisting multiple strands of single ropes or formed by loosely overlapping multiple single ropes.

Further, the at least one colorized identification strap group is a plurality of colorized identification strap groups, the plurality of colorized identification strap groups provided at the outer periphery edge of the armored protection duct have same colors; and colorized identification strap groups at different armored protection ducts have different colors When three hollow passages are disposed in the encapsulated protection layer, a first identification strap group, second identification strap group, and third identification strap group are arranged at respective thin portions of three armored protection ducts.

It is provided a preparation method of the encapsulated tubular cable with colorized identification straps, including:

Step for preparing the armored protection duct, including: placing a steel roll raw material on a steel belt reeling equipment; passing a start end of the steel roll raw material through a steel duct forming equipment, a steel duct laser welding equipment, an external burr removing equipment, a steel duct drawing equipment, an annealing furnace, and a nondestructive flaw detection equipment in sequence to obtain the armored protection duct; and rolling up the armored protection duct by an armored-protection-duct reeling equipment for use in a next procedure;

Step for preparing the encapsulation protection layer: placing the armored protection duct to be encapsulated on the armored-protection-duct reeling equipment; placing cables or oil tubes on a cable reeling equipment; passing a start end of the armored protection duct through a straightening equipment, a preheating equipment, an identification strap reeling equipment, an extrusion equipment, a cooling device, and a draw-off equipment to form the encapsulated tubular cable with the encapsulation protection layer; and rolling up the encapsulated tubular cable by an encapsulated-duct-cable reeling equipment.

When the encapsulation protection layer is set to be the double-layer structure, the step for preparing the encapsulation protection layer includes:

placing the armored protection duct to be encapsulated on the armored-protection-duct reeling equipment; placing the cables or oil tubes on the cable reeling equipment; passing the start end of the armored protection duct through the straightening equipment, the preheating equipment, the identification strap reeling equipment, the extrusion equipment, the cooling device, and the draw-off equipment to form an encapsulated tubular cable with an inner positioning layer; and rolling up the encapsulated tubular cable with the inner positioning layer by the encapsulated-duct-cable reeling equipment for use in a subsequent procedure;

Step for preparing an outer protection layer, comprising: placing the encapsulated tubular cable with the inner positioning layer on the encapsulated-duct-cable reeling equipment; passing the start end of the armored protection duct through the straightening equipment, the preheating equipment, the extrusion equipment, the cooling device, and the draw-off equipment to form the encapsulated tubular cable with an outer positioning layer, wherein the outer protection layer is wrapped around a periphery of the inner positioning layer to form a finished encapsulated tubular cable which is rolled up by the encapsulated-duct-cable reeling equipment.

Compared with the existing technology, the present disclosure has the following beneficial effects.

The encapsulated tubular cable with colorized identification traps of the present disclosure includes the armored protection ducts, the encapsulation protection layer, and the colorized identification straps. The encapsulation protection layer is made of the non-metal materials and completely wraps the armored protection ducts to play a role of protecting the armored protection ducts, so that the entire cables have properties of excellent resistance to oil, corrosion and temperature and have longer service life. In addition, the encapsulation protection layer is designed into the special-shaped single-layer structure, the double-layer structure or the arc-shaped structure as desired. and the sunken parts of the special-shaped single-layer structure correspond to the positions of the colorized identification straps to facilitate operations of tearing and encapsulating the colorized identification straps and improve the operating efficiency. Wire cables, the optical fibers, or the oil ducts are placed in the hollow passages at different positions, the colorized identification straps are marked by corresponding colors according to different functions, and the marked labels are stuck to the encapsulation protection layer for workers to check, so that the encapsulated duct cables are more convenient and quicker to use. The colorized identification straps are formed by twisting multiple strands of single ropes or loosely overlapping multiple single ropes, and can be dyed into various colors by machining, so that the straps have high strength and are distinguishable. With the straps, each hollow passage can be identified, and packages can be torn away to peel off the cables or optical fibers from the packages. The single rope has a smaller cross-sectional area, so that it is sharper during tearing, and the tear operation is more convenient and quicker.

In summary, the present disclosure is ingenious in concept and compact and reasonable in layout, and has double functions of oil delivery and data transmission. The encapsulation protection layer improves the corrosion resistance of the encapsulated duct cable; the colorized identification straps are provided at the positions corresponding to the thinnest portions of the encapsulation protection layer to facilitate tearing the packages. Each colorized identification strap has its own color identifier, so that it is convenient to distinguish objects in each hollow passage during use.

BRIEF DESCRIPTION OF THE DRAWINGS

The present disclosure is further described below in combination with the following drawings.

List of reference numbers: 1: hollow passage; 2: armored protection duct; 3: encapsulation protection layer; 301: first sunken region; 302: second sunken region; 3-1: inner positioning layer; 3-2: outer protection layer; 4: colorized identification strap group; 401: first identification strap group; 402: second identification strap group; 403: third identification strap group;

5: forming mold for a special-shaped encapsulation protection layer; 501: connection screw hole; 502: extrusion forming hole;

6: forming mold with identification straps; 6-1: outer mold; 6-2: inner mold; 601: identification strap placement hole; 602: cable placement hole.

DETAILED DESCRIPTION

As shown in FIG. 1 to FIG. 7, an encapsulated tubular cable with a colorized identification strap includes armored protection ducts 2 and an encapsulation protection layer 3. A hollow passage 1 is formed in a center of the armored protection duct 2. Cables, optical fibers, or oil-liquid tubes are placed in the hollow passage 1. The encapsulation protection layer 3 is wrapped around a periphery of the armored protection duct 2. A plurality of armored protection ducts 2 are arranged in one encapsulated protection layer 3.

Figure 1:
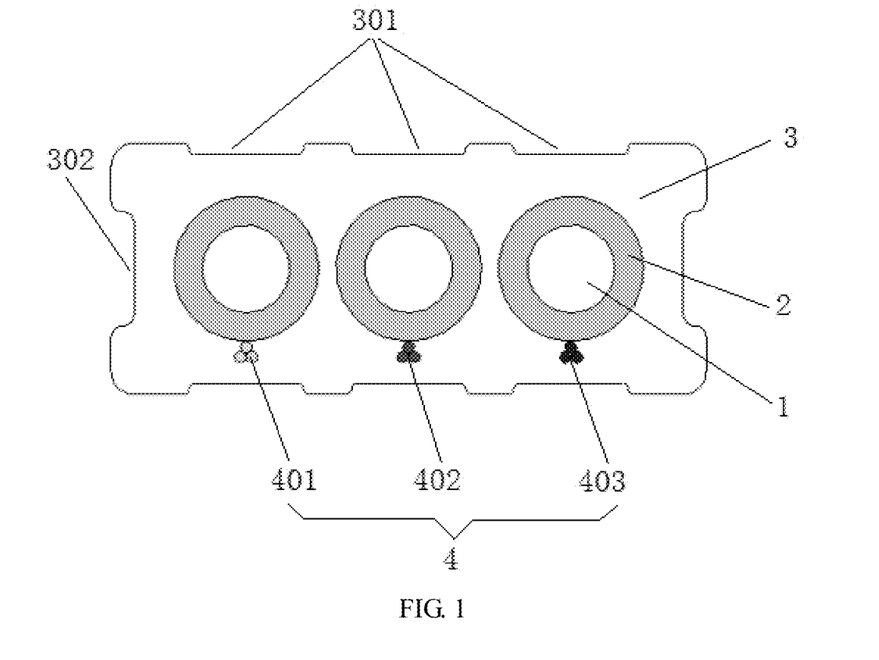
FIG. 1 is a schematic diagram of Embodiment one of an encapsulated tubular cable with colorized identification straps according to the present disclosure.
Figure 2:
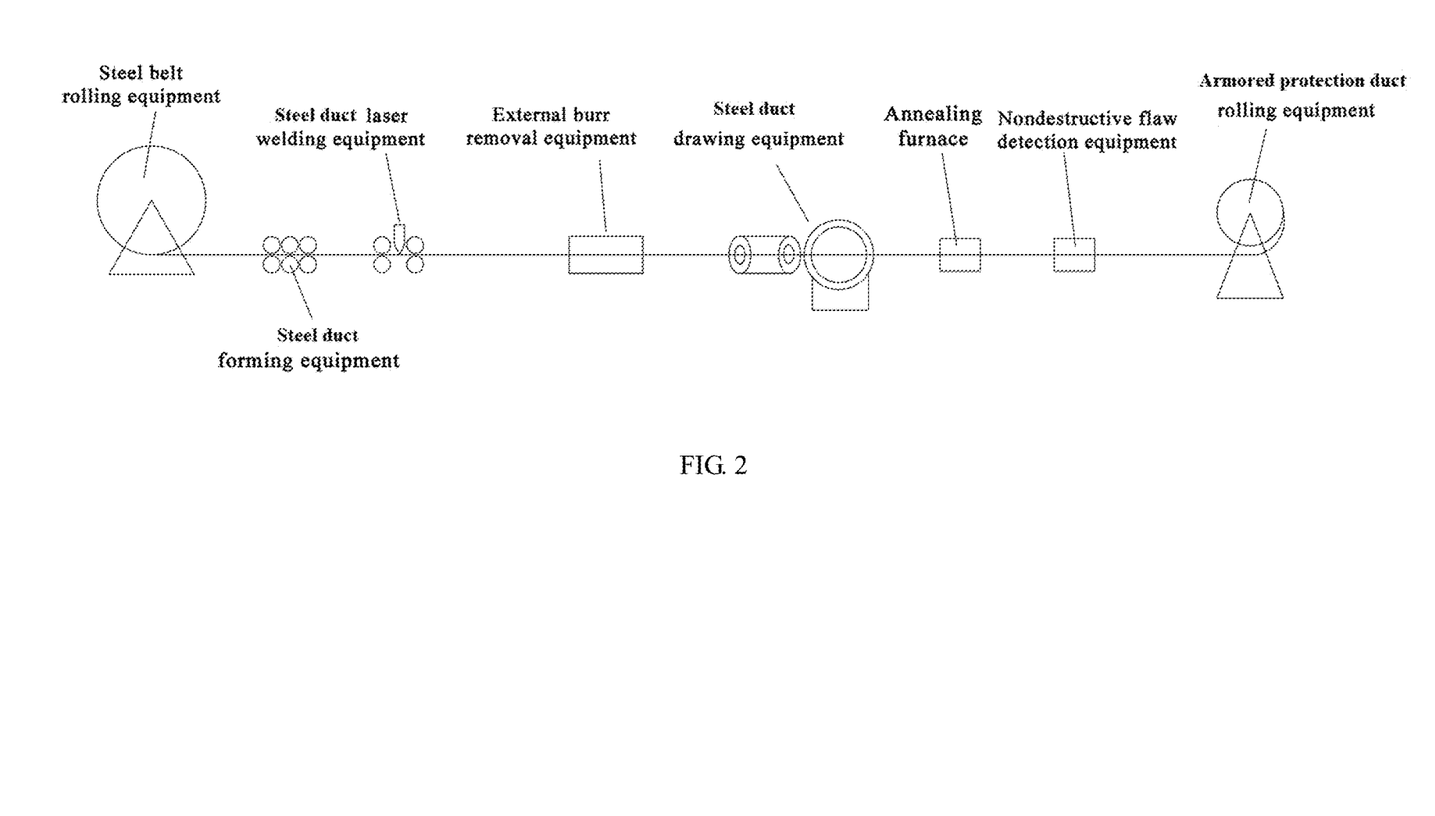
FIG. 2 is a flowchart for manufacturing an armored protection duct according to the present disclosure.
Figure 3:
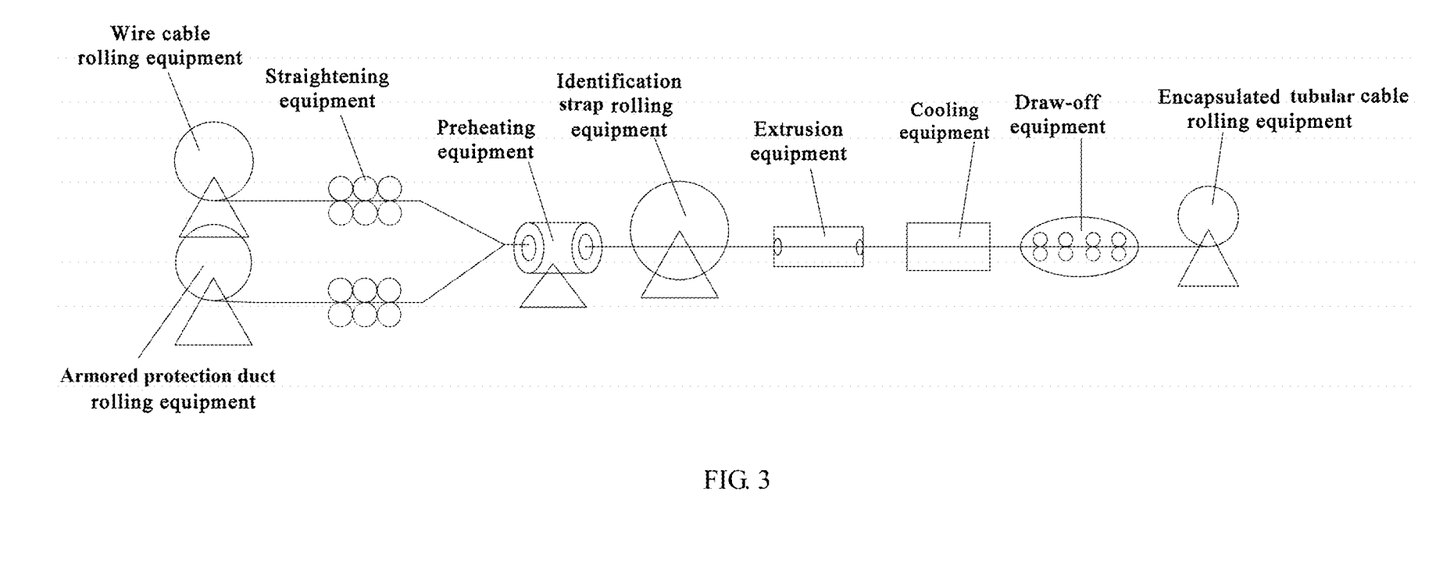
FIG. 3 is a flowchart for manufacturing an encapsulation protection layer according to the present disclosure.

A peripheral edge of each armored protection duct 2 is correspondingly provided with at least one colorized identification strap group 4.

Specifically, each armored protection duct 2 is made of a stainless steel welded tube. A material for the stainless steel welded tube includes 316L, 825, or 2205, but is not limited to these materials. The encapsulation projection layer 3 is made of a non-metal material. The non-metal material includes polyfluoroethylene, perfluoroethylene propylene, high density polyethylene, perfluoroalkoxy, modified polypropylene, a polyvinylidene fluoride or thermoplastic vulcanized rubber material, nylon 11, and other materials that can meet function requirements.

Figure 4:
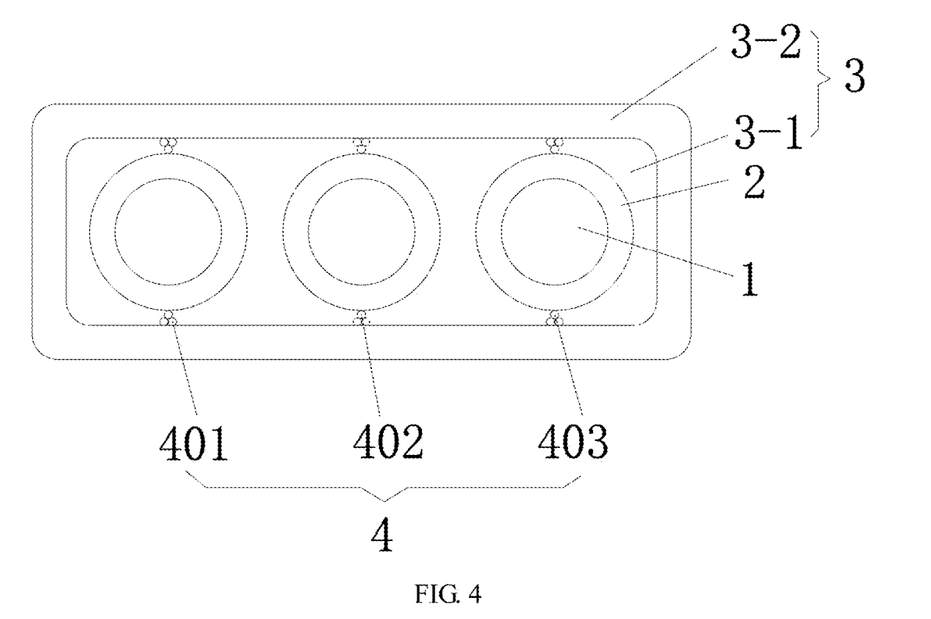
FIG. 4 is a schematic diagram of Embodiment two of the encapsulated tubular cable with the colorized identification straps according to the present disclosure.
Figure 5:
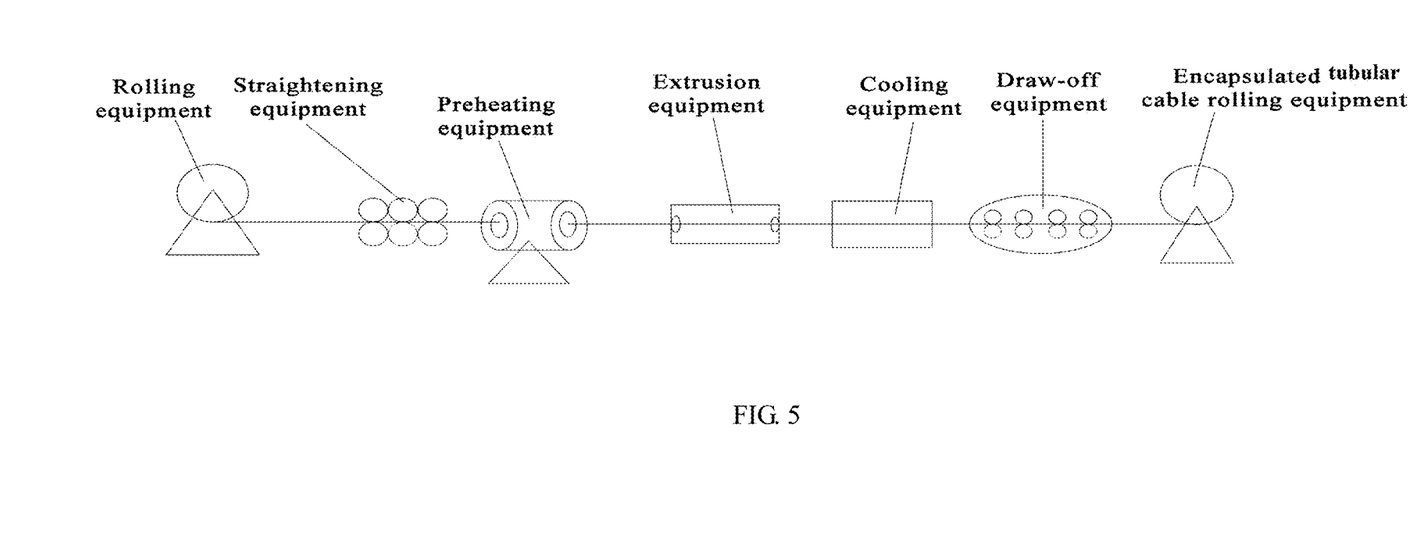
FIG. 5 is a flowchart for manufacturing an outer protection layer according to the present disclosure.
Figure 6:
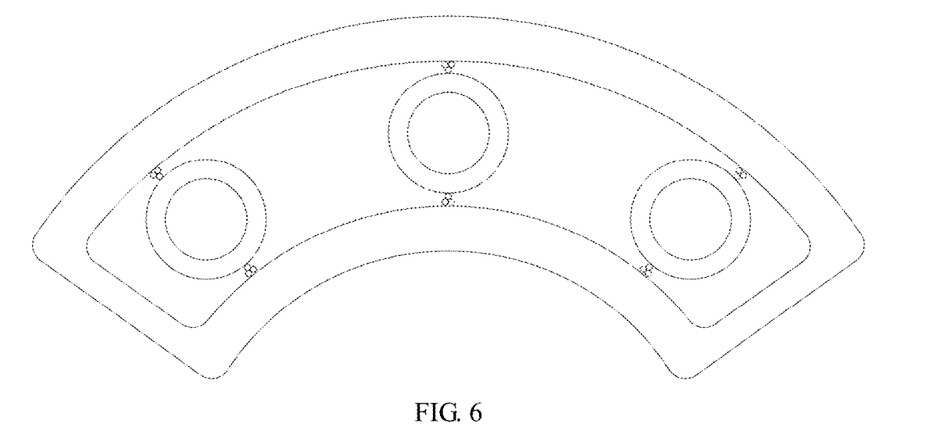
FIG. 6 is a schematic diagram of Embodiment three of the encapsulated tubular cable with the colorized identification straps according to the present disclosure.

As shown in FIG. 1, FIG. 4, and FIG. 6, the encapsulation protection layer 3 is designed to be a special-shaped single-layer structure, a double-layer structure, or an arc-shaped structure. A structural form of the encapsulation protection layer is customized according to actual operation scenarios and customer's needs.

In one embodiment, as shown in FIG. 1, when the encapsulation protection layer 3 is designed to be a special-shaped single-layer structure, four outer side surfaces of the encapsulation protection layer 3 are provided with sunken regions. Wide outer side surfaces are provided with a plurality of first sunken regions 301, and narrow outer side surfaces are provided with one second sunken region 302. The colorized identification strap group 4 is provided on at least one of portions of the periphery of each armored protection duct 2 corresponding to the sunken regions.

Specifically, in another embodiment, as shown in FIG. 4, the encapsulation protection layer 3 includes an inner positioning layer 3-1 and an outer positioning layer 3-2 when it is designed to be a double-layer structure. The inner positioning layer 3-1 is disposed around the peripheries of a plurality of armored protection ducts 2; one side edge of the colorized identification strap group 4 facing away from the armored protection duct 2 is flush with an outer peripheral edge of the inner positioning layer 3-1. The outer protection layer 3-2 is wrapped on the peripheral surface of the inner positioning layer 3-1.

Specifically, the colorized identification strap is made from an aramid rope, and a single colorized identification strap group 4 is formed by twisting multiple strands of single ropes or formed by loosely overlapping multiple single ropes. The colorized identification strap groups 4 at different positions have different colors, and the multiple colorized identification strap groups 4 at the peripheral edge of the same armored protection duct 2 have the same colors. When three hollow passages 1 are disposed in the encapsulated protection layer 3, a first identification strap group 401, a second identification strap group 402, and a third identification strap group 403 are disposed on the portions of the three armored protection ducts 2 corresponding to the sunken regions, respectively.

A preparation method of the encapsulated tubular cable with the colorized identification strap includes the following steps:

Step I, preparation of the armored protection duct 2: placing a steel roll raw material on steel belt reeling equipment, machining the start end of the steel roll raw material into the armored protection duct after the start end passes through steel duct forming equipment, steel duct laser welding equipment, external burr removal equipment, steel duct drawing equipment, an annealing furnace, and nondestructive detection equipment in sequence, and coiling the armored protection duct under the action of armored-protection-duct reeling equipment for use in the next procedure;

Step II, preparation of the encapsulation protection layer 3: placing the armored protection duct 2 to be encapsulated on the armored-protection-duct reeling equipment, placing cables or oil-liquid tubes on cable reeling equipment, forming an encapsulated tubular cable with the encapsulation protection layer after the start end of the armored protection duct passes through straightening equipment, preheating equipment, identification strap reeling equipment, extrusion equipment, a cooling device, and draw-off equipment, and coiling the encapsulated tubular cable under the action of the reeling equipment.

Specifically, when the encapsulation protection layer 3 is set to be the double-layer structure, the preparation of the encapsulation protection layer 3 includes two steps: 1) placing the armored protection duct 2 to be encapsulated on the armored-protection-duct reeling equipment, placing the cables or oil-liquid tubes on the cable reeling equipment, passing the start end of the armored protection duct through straightening equipment, preheating equipment, identification strap reeling equipment, extrusion equipment, a cooling device, and draw-off equipment to form an encapsulated tubular cable with an inner positioning layer 3-1, and coiling the encapsulated tubular cable with the inner positioning layer 3-1 under the action of the reeling equipment for use in the next procedure;

2) preparation of an outer protection layer 3-2: placing the encapsulated tubular cable with the inner positioning layer 3-1 on the reeling equipment, passing the start end of the armored protection duct through the straightening equipment, the preheating equipment, the extrusion equipment, the cooling device, and the draw-off equipment to form an encapsulated tubular cable with an outer positioning layer 3-2, wrapping the periphery of the inner positioning layer 3-1 with the outer protection layer 3-2 to form a finished encapsulated duct cable, and coiling the finished encapsulated tubular cable under the action of the reeling equipment.

Figure 7:
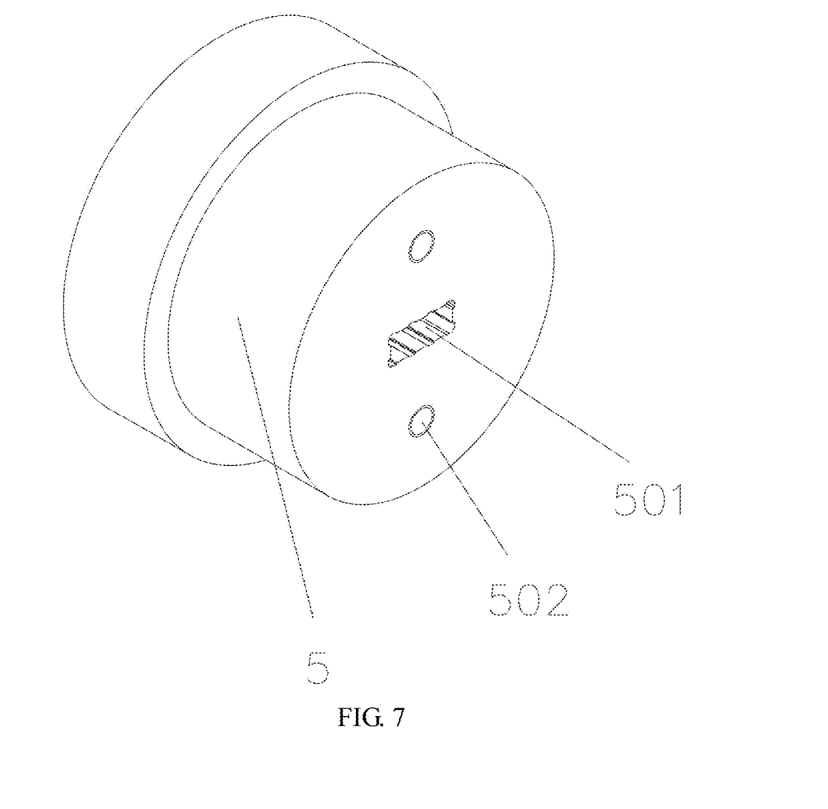
FIG. 7 is a schematic diagram of a forming mold for a special-shaped encapsulation protection layer according to the present disclosure.
Figure 8:
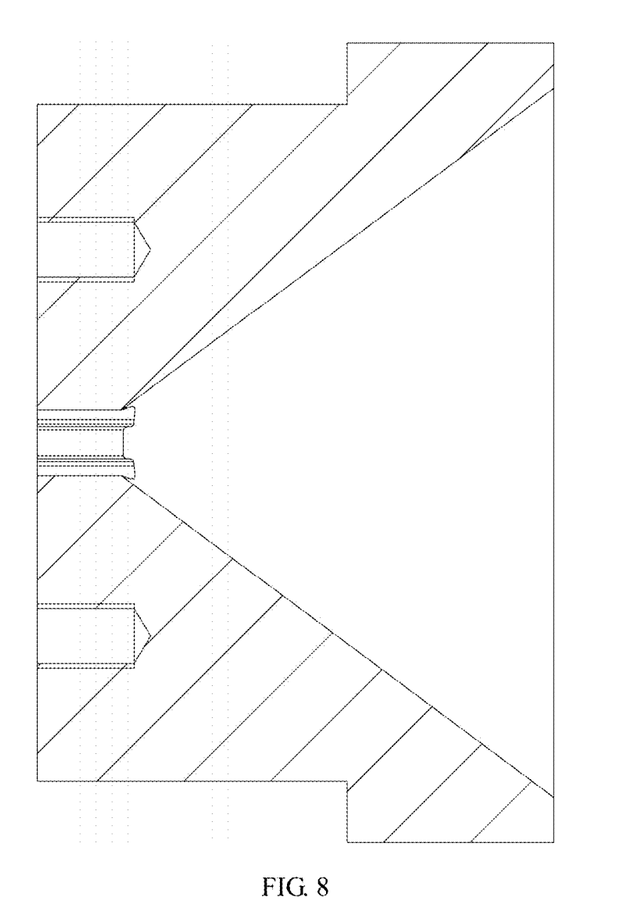
FIG. 8 is a sectional view of the forming mold for the special-shaped encapsulation protection layer according to the present disclosure.
Figure 9:
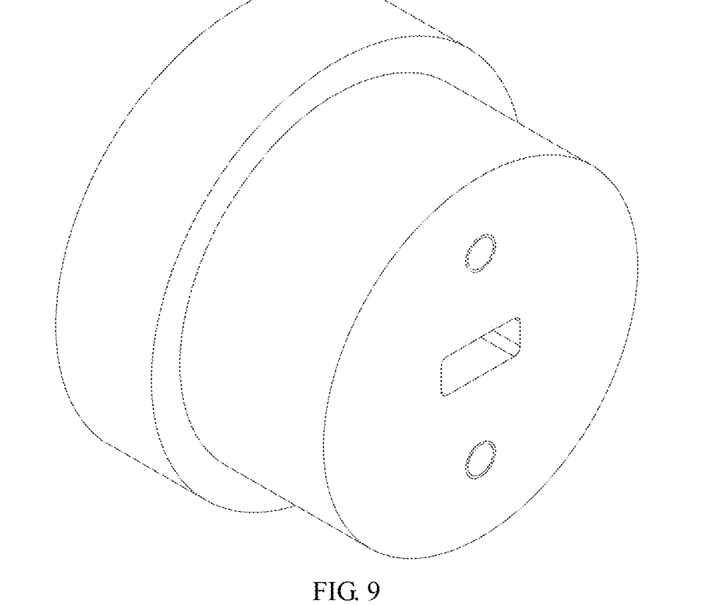
FIG. 9 is a schematic structural diagram of an outer mold with the identification strap, of the forming mold according to the present disclosure.
Figure 10:
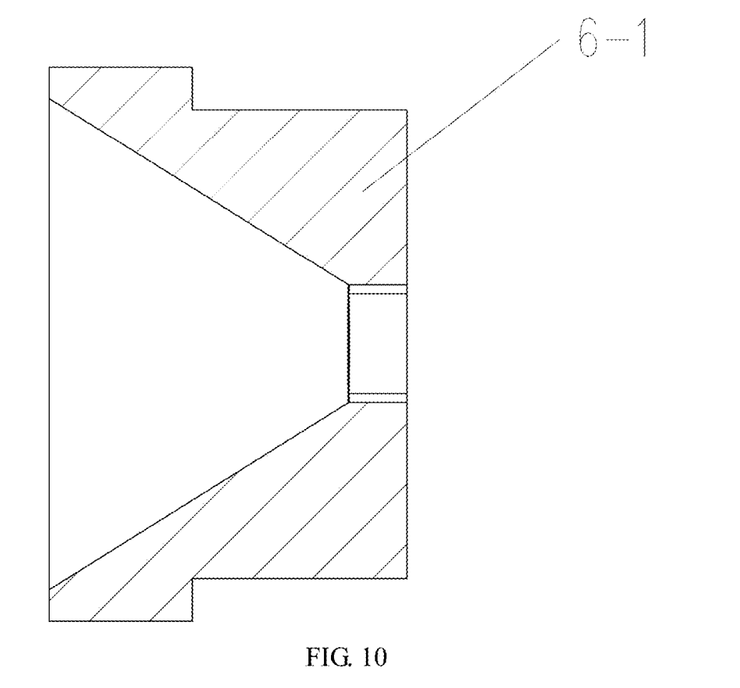
FIG. 10 is a sectional view of the outer mold with the identification straps, of the forming mold according to the present disclosure.
Figure 11:
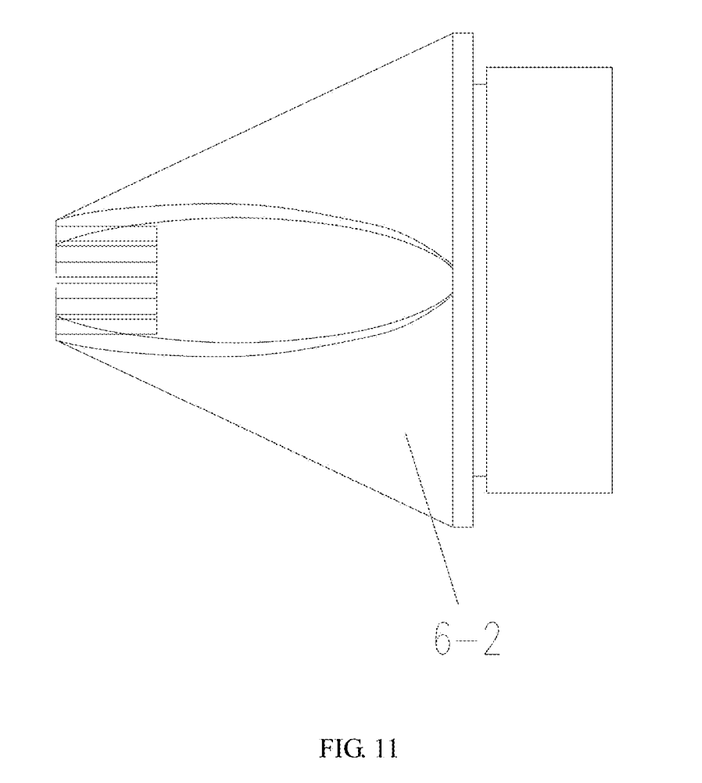
FIG. 11 is a schematic structural diagram of an inner mold with the identification straps, of the forming mold according to the present disclosure.
Figure 12:
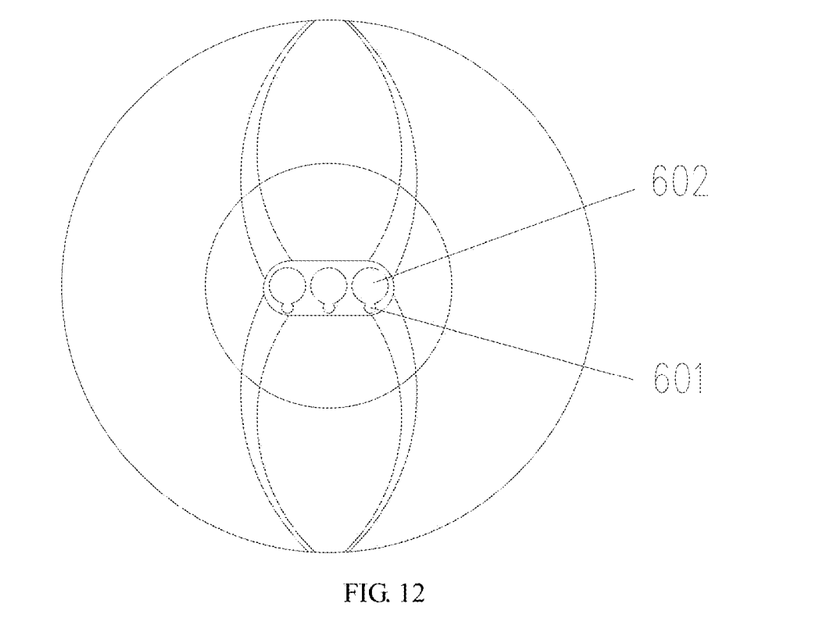
FIG. 12 is a schematic diagram of a forming opening of the inner mold with an identification straps, of the forming mold according to the present disclosure.

As shown in FIG. 7 and FIG. 8, a forming mold 5 of a special-shaped encapsulation protection layer is illustrated, which is mainly applied to the step II. When in use, the forming mold 5 of a special-shaped encapsulation protection layer is mounted on the extrusion equipment, and a bolt is screwed up in a connection bolt hole 501 for connection. The special-shaped encapsulation protection layer is formed by means of extrusion forming holes 502; and when the extrusion forming holes are square, the outer protection layer 3-2 can be formed.

As shown in FIG. 9 to FIG. 12, during formation of the inner positioning layer 3-1, a forming mold 6 with an identification strap on the extrusion equipment is used. The forming mold 6 with an identification strap includes an outer mold 6-1 and an inner mold 6-2. A cone at the front end of the inner mold 6-2 is embedded into a center hole of the outer mold 6-1 for engagement. A gap between the head of the inner mold 6-2 and the head of the outer mold 6-1 is configured to form the inner positioning layer 3-1; and during formation, corresponding colorized identification straps 4 and cables are placed in identification strap placement holes 601 and cable placement holes 602 of the inner mold 6-2, respectively.

The above-mentioned embodiments only describe the preferred modes of the present disclosure, and do not limit the scope of the present disclosure. Various deformations and improvements that are made by those of ordinary skill in the art to the technical solutions of the present disclosure without departing from the design spirit of the present disclosure shall all fall within the protection scope determined by the claims of the present disclosure.

What is claimed is:

1. An encapsulated tubular cable with colorized identification straps, comprising armored protection ducts and an encapsulation protection layer, wherein hollow passages are respectively formed in centers of the armored protection ducts; cables, optical fibers, or oil tubes are placed in the hollow passages; and the encapsulation protection layer wraps around the armored protection ducts; a plurality of armored protection ducts are arranged in the encapsulated protection layer; an outer peripheral edge of each armored protection duct is provided with at least one colorized identification strap group; straps of the colorized identification strap group are made of aramid ropes, and a single colorized identification strap group is formed by twisting multiple strands of single ropes or formed by loosely overlapping multiple single ropes.

2. The encapsulated tubular cable with the colorized identification straps according to claim 1, wherein the armored protection duct is made of a welded stainless steel tube, and the encapsulation protection layer is made of a non-metal material.

3. The encapsulated tubular cable with the colorized identification straps according to claim 1, wherein the encapsulation protection layer is designed to be a special-shaped single-layer structure, a double-layer structure, or an arc-shaped structure.

4. The encapsulated tubular cable with the colorized identification straps according to claim 3, wherein when the encapsulation protection layer is designed to be the special-shaped single-layer structure, four outer side surfaces of the encapsulation protection layer each are provided with sunken regions; wide outer side surfaces of the four outer side surfaces each are provided with a plurality of first sunken regions, and narrow outer side surfaces of the four outer side surfaces each are provided with one second sunken region; and at least one thin portion of the outer periphery edge of the armored protection duct which corresponds to the first sunken regions or the second sunken region is provided with the colorized identification strap group.

5. The encapsulated tubular cable with the colorized identification straps according to claim 3, wherein the encapsulation protection layer comprises an inner positioning layer and an outer positioning layer when being designed to be the double-layer structure; the inner positioning layer is disposed at the outer periphery edge of each armored protection duct wrapping around corresponding hollow passage; a side edge of the colorized identification strap group facing away from the armored protection duct is flush with an outer peripheral edge of the inner positioning layer; and the outer protection layer is wrapped on an outer peripheral surface of the inner positioning layer.

6. The encapsulated tubular cable with the colorized identification straps according to claim 1, wherein the at least one colorized identification strap group is a plurality of colorized identification strap groups, the plurality of colorized identification strap groups provided at the outer periphery edge of the armored protection duct have same colors; colorized identification strap groups provided at different armored protection ducts have different colors.

7. The encapsulated tubular cable with the colorized identification straps according to claim 6, wherein when three hollow passages are disposed in the encapsulated protection layer, a first identification strap group, second identification strap group, and third identification strap group are arranged at respective thin portions of three armored protection ducts.

8. A preparation method of an encapsulated tubular cable with colorized identification straps, the encapsulated tubular cable comprises armored protection ducts and an encapsulation protection layer, wherein hollow passages are respectively formed in centers of the armored protection ducts; cables, optical fibers, or oil tubes are placed in the hollow passages; and the encapsulation protection layer wraps around the armored protection ducts; a plurality of armored protection ducts are arranged in the encapsulated protection layer; and an outer peripheral edge of each armored protection duct is provided with at least one colorized identification strap group;

wherein the preparation method comprises:

Step for preparing the armored protection duct, comprising: placing a steel roll raw material on a steel belt reeling equipment; passing a start end of the steel roll raw material through a steel duct forming equipment, a steel duct laser welding equipment, an external burr removing equipment, a steel duct drawing equipment, an annealing furnace, and a nondestructive flaw detection equipment in sequence to obtain the armored protection duct; and rolling up the armored protection duct by an armored-protection-duct reeling equipment for use in a next procedure;

Step for preparing the encapsulation protection layer: placing the armored protection duct to be encapsulated on the armored-protection-duct reeling equipment; placing cables or oil tubes on a cable reeling equipment; passing a start end of the armored protection duct through a straightening equipment, a preheating equipment, an identification strap reeling equipment, an extrusion equipment, a cooling device, and a draw-off equipment to form the encapsulated tubular cable with the encapsulation protection layer; and rolling up the encapsulated tubular cable by an encapsulated-duct-cable reeling equipment.

9. The preparation method of the encapsulated tubular cable with the colorized identification straps according to claim 8, wherein when the encapsulation protection layer is set to be the double-layer structure, the step for preparing the encapsulation protection layer comprises:

placing the armored protection duct to be encapsulated on the armored-protection-duct reeling equipment; placing the cables or oil tubes on the cable reeling equipment; passing the start end of the armored protection duct through the straightening equipment, the preheating equipment, the identification strap reeling equipment, the extrusion equipment, the cooling device, and the draw-off equipment to form an encapsulated tubular cable with an inner positioning layer; and rolling up the encapsulated tubular cable with the inner positioning layer by the encapsulated-duct-cable reeling equipment for use in a subsequent procedure;

Step for preparing an outer protection layer, comprising: placing the encapsulated tubular cable with the inner positioning layer on the encapsulated-duct-cable reeling equipment; passing the start end of the armored protection duct through the straightening equipment, the preheating equipment, the extrusion equipment, the cooling device, and the draw-off equipment to form the encapsulated tubular cable with an outer positioning layer, wherein the outer protection layer is wrapped around a periphery of the inner positioning layer to form a finished encapsulated tubular cable which is rolled up by the encapsulated-duct-cable reeling equipment.

10. The preparation method of the encapsulated tubular cable with the colorized identification straps according to claim 8, wherein the armored protection duct is made of a welded stainless steel tube, and the encapsulation protection layer is made of a non-metal material.

11. The preparation method of the encapsulated tubular cable with the colorized identification straps according to claim 8, wherein the encapsulation protection layer is designed to be a special-shaped single-layer structure, a double-layer structure, or an arc-shaped structure.

12. The preparation method of the encapsulated tubular cable with the colorized identification straps according to claim 11, wherein when the encapsulation protection layer is designed to be the special-shaped single-layer structure, four outer side surfaces of the encapsulation protection layer each are provided with sunken regions; wide outer side surfaces of the four outer side surfaces each are provided with a plurality of first sunken regions, and narrow outer side surfaces of the four outer side surfaces each are provided with one second sunken region; and at least one thin portion of the outer periphery edge of the armored protection duct which corresponds to the first sunken regions or the second sunken region is provided with the colorized identification strap group.

13. The preparation method of the encapsulated tubular cable with the colorized identification straps according to claim 11, wherein the encapsulation protection layer comprises an inner positioning layer and an outer positioning layer when being designed to be the double-layer structure; the inner positioning layer is disposed at the outer periphery edge of each armored protection duct wrapping around corresponding hollow passage; a side edge of the colorized identification strap group facing away from the armored protection duct is flush with an outer peripheral edge of the inner positioning layer; and the outer protection layer is wrapped on an outer peripheral surface of the inner positioning layer.

14. The preparation method of the encapsulated tubular cable with the colorized identification straps according to claim 8, wherein straps of the colorized identification strap group are made of aramid ropes, and a single colorized identification strap group is formed by twisting multiple strands of single ropes or formed by loosely overlapping multiple single ropes.

15. The preparation method of the encapsulated tubular cable with the colorized identification straps according to claim 14, wherein the at least one colorized identification strap group is a plurality of colorized identification strap groups, the plurality of colorized identification strap groups provided at the outer periphery edge of the armored protection duct have same colors; colorized identification strap groups provided at different armored protection ducts have different colors.

16. The preparation method of the encapsulated tubular cable with the colorized identification straps according to claim 15, wherein when three hollow passages are disposed in the encapsulated protection layer, a first identification strap group, second identification strap group, and third identification strap group are arranged at respective thin portions of three armored protection ducts.

\* \* \* \* \*